United States Patent [19]

Skvarenina

[11] 3,895,522

[45] July 22, 1975

[54] SIGHT GLASS FOR METAL LIQUID CONTAINERS

[76] Inventor: John A. Skvarenina, 2639 W. Augusta, Chicago, Ill. 60622

[22] Filed: Apr. 29, 1974

[21] Appl. No.: 465,431

[52] U.S. Cl. ............................................. 73/323
[51] Int. Cl. .......................................... G01f 23/02
[58] Field of Search ......... 73/323; 222/83, 85, 85.5, 222/87, 89, 157

[56] References Cited
UNITED STATES PATENTS
3,505,870  4/1970  Smylie .................................. 73/323

Primary Examiner—Richard E. Aegerter
Assistant Examiner—Willis Little
Attorney, Agent, or Firm—Olson, Trexler, Wolters, Bushnell & Fosse, Ltd.

[57] ABSTRACT

The embodiment of the invention disclosed herein is directed to a sight glass assembly for metal liquid containers which includes a cylindrical sleeve portion to be positioned about the liquid container and sealed relative thereto. The sight glass assembly has the transparent window formed across an opening at one end of the cylindrical sleeve and piercing means extend from a point radially inwardly of the cylindrical sleeve to engage and pierce the bottom portion of the metal container. The liquid within the metal container can then flow into a chamber formed between the bottom wall of the container and the transparent window so that the quantity of liquid within the container can be viewed when the container is held on its side. The sight glass is graduated to indicate the number of fluid ounces within the container.

10 Claims, 6 Drawing Figures

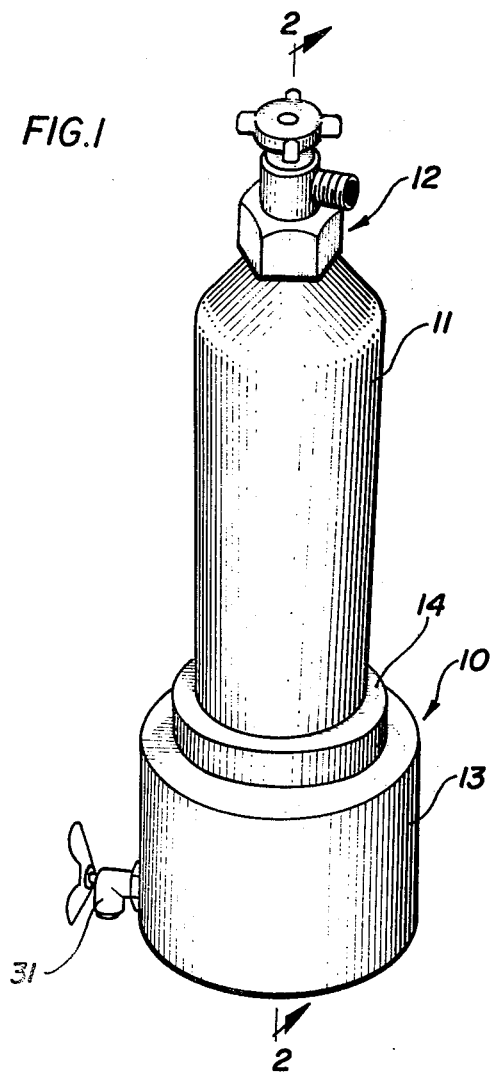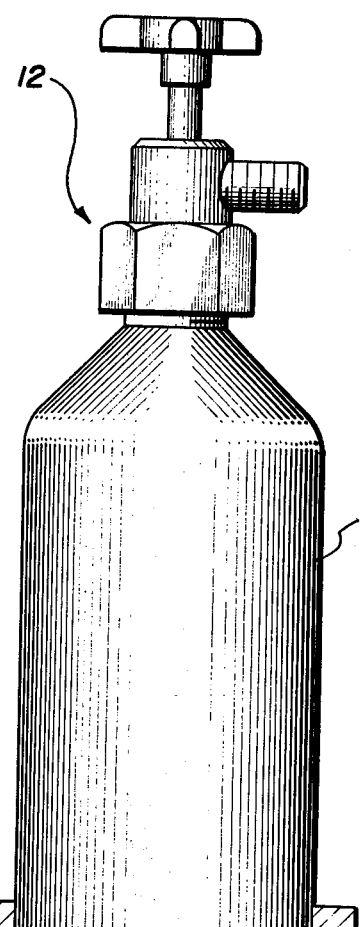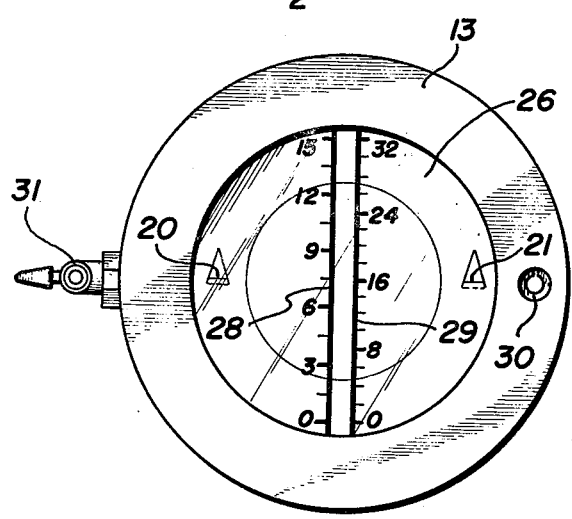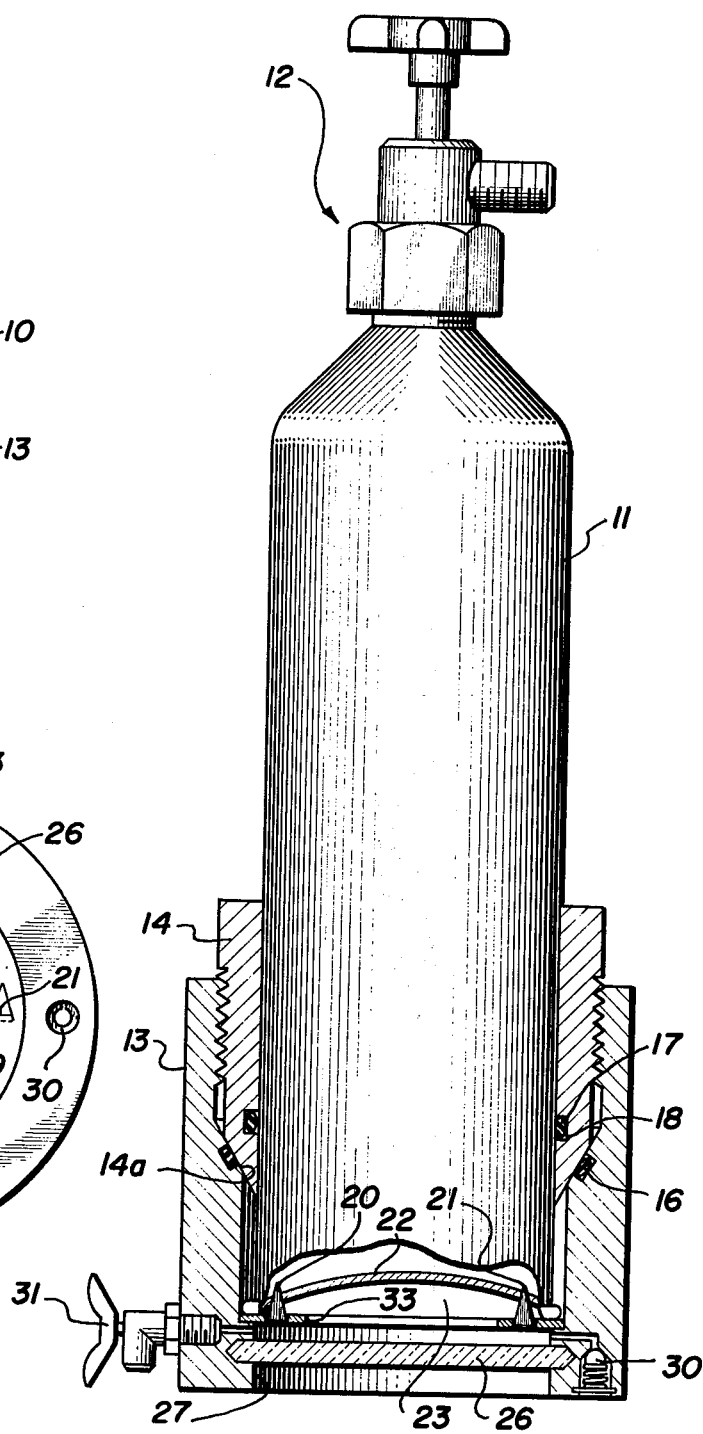

SIGHT GLASS FOR METAL LIQUID CONTAINERS

BACKGROUND OF THE INVENTION

This invention relates generally to a sight glass assembly for connection to liquid containers, and more particularly to a sight glass for connection to a liquid container containing a quantity of refrigerant materials such as Freon or the like.

Heretofore, when recharging refrigerating systems such as air conditioners, refrigerators and freezers with refrigerant material, disposable containers such as metal cans having a specific quantity of refrigerant therein are used. In many instances the quantity of refrigerant to be added to a refrigerating system is rather critical and a slight amount of refrigerant above or below the critical amount will cause improper cooling action of the refrigerating system. Therefore, it is often very desirable to precisely determine the amount of liquid refrigerant to be added to a refrigeration system within half an ounce of the desired quantity. This is presently accomplished with complicated and expensive equipment which meters the proper quantity of refrigerant into the system. This prior art apparatus not only is expensive, but is rather cumbersome and awkward to handle and is not easily portable from place to place to accommodate repairing refrigerators and the like at their operating locations.

SUMMARY OF THE INVENTION

Accordingly, it is an object of this invention to provide a new article of manufacture which will enable presently existing disposable metal liquid containers for refrigerant material to be punctured and simultaneously form a chamber wherein the amount of refrigerant liquid can be viewed so that the precise quantity of liquid obtained from the container for a particular refrigerating system can be easily determined.

Another object of this invention is to provide a new and improved sight glass structure which can be adapted to metal, liquid containers of any general configuration.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a metal, liquid container having a sight glass assembly fastened thereto in accordance with the principles of this invention;

FIG. 2 is a side elevational sectional view of the sight glass assembly constructed in accordance with the principles of this invention and fastened to the bottom portion of a metal, liquid container;

FIG. 3 is an end view of the sight glass assembly of this invention;

DETAILED DESCRIPTION OF THE ILLUSTRATED EMBODIMENTS

Figure 4:
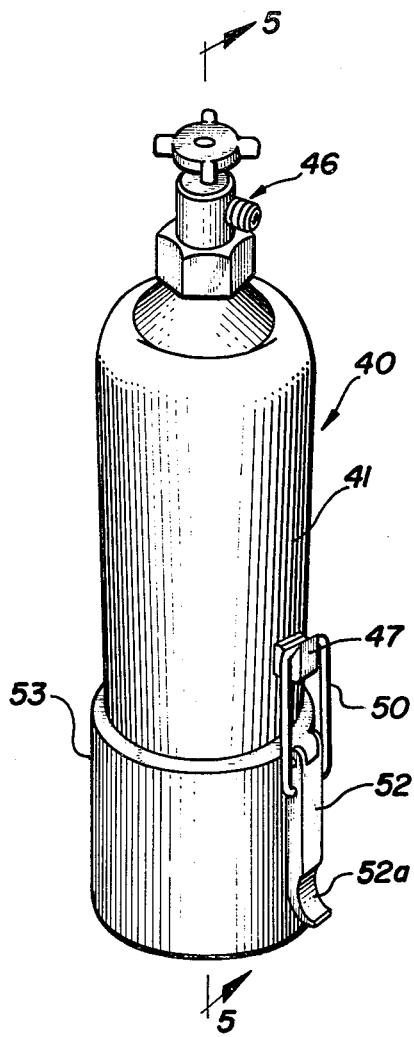
FIG. 4 is a perspective view illustrating an alternate embodiment of the sight glass assembly constructed in accordance with the principles of this invention.

Referring now to FIG. 1, there is seen a sight glass structure assembly designated generally by reference numeral 10, here shown fastened to the bottom portion of a metal, liquid container 11, which may be of the disposable type. The container 11 can be filled with any liquid material, but is here illustrated as the type containing a quantity of refrigerant material such as Freon. Also illustrated on the drawings is a standard outlet valve assembly 12 which is commonly used as a control valve connection between the container and metering or gauge lines to be connected to a refrigerating system. The container 11 and control valve 12 are commercially available standard components and are used in conjunction with the sight glass assembly of this invention.

The sight glass assembly 10 is formed of a cylindrical sleeve member 13 which has a collet element 14 threadedly engageable therewith. This is best illustrated in FIG. 2, which shows the tapered inner wall surface 13a of the cylinder 13 cooperating with the tapered wall surface 14a of the collet 14 to confine an O-ring seal 16 therebetween. The second O-ring seal 17 is formed in an annular groove 18 within the collet 14 and provides a seal between the collet and the peripheral surface of the container 11.

As the cylindrical sleeve 13 and collet 14 are threaded together, the collet will ultimately firmly engage the periphery of the container 11. Therefore, continual threading will cause the cylindrical sleeve to be threaded upon the container so that piercing elements 20 and 21 puncture the bottom wall 22 of the container 11 so that the liquid therein will flow from the container into a chamber 23. The chamber 23 is defined by the bottom wall 22 and a transparent window element 26 which is sealed across an opening 27 formed at the bottom end of the cylinder 13.

As best seen in FIG. 3, the transparent window element may have two graduations 28 and 29 formed thereon. Therefore, different volume containers can be accommodated as long as they are substantially of the same diameter. Different diameter containers may also be accommodated by providing adapter collets, such as the collet 14, which have the same threaded dimensions but with different inside diameter.

The sight glass assembly 10 may include a safety check valve assembly 30 in fluid communication with the interior of the chamber 23, this being provided for safety purposes. Also in fluid communication with the chamber 23 is a flow control valve 31 which can take the place of the flow control valve 12, presently used on disposable containers of refrigerant material. When the flow control valve 31 is used, the disposable container of refrigerant material can be constructed having similar closed flat ends at both ends of the container.

The piercing elements 20 and 21 may be formed as part of an annular ring 33 which is placed within the cylindrical sleeve as illustrated in FIG. 2. It will be understood that a seal about the periphery of the container 11 is first formed by the O-rings 16 and 17 before the cylindrical sleeve is drawn up tight enough to cause the piercing elements to puncture the bottom of the can.

Figure 5:
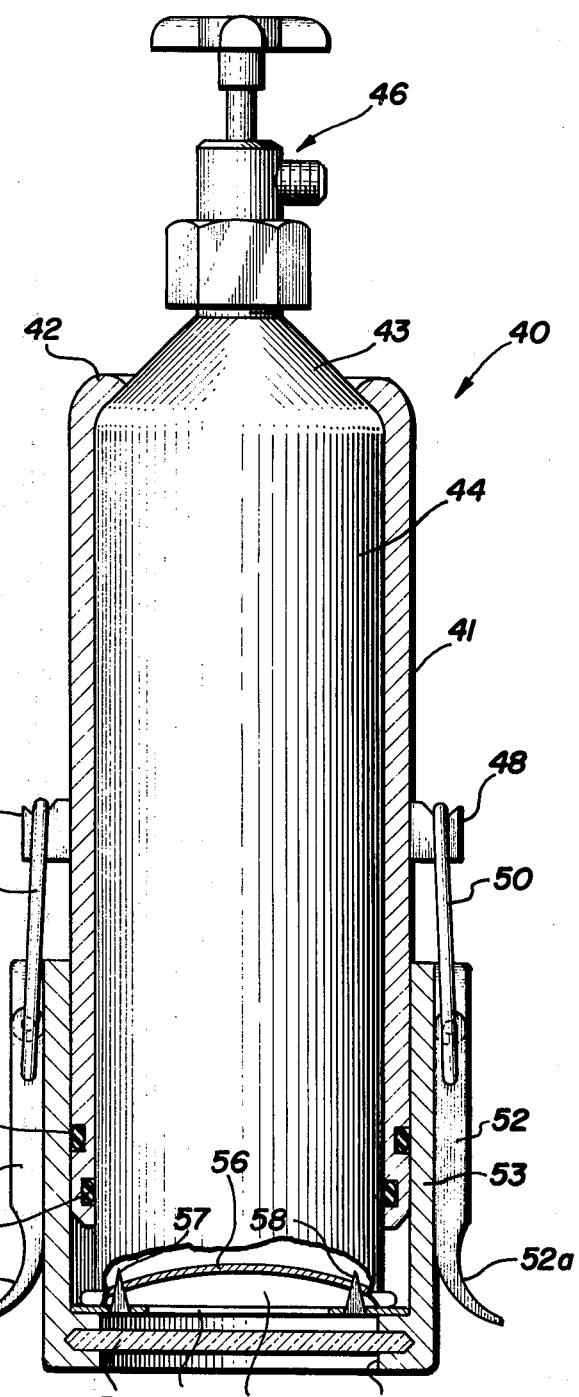
FIG. 5 is an elevational sectional view of the structure of FIG. 4.

Referring now to FIGS. 4 and 5, there is seen an alternate form of the sight glass assembly constructed in accordance with the principles of this invention and is designated generally by reference numeral 40. The sight glass assembly 40 includes a first sleeve portion 41 having a radially inwardly directed upper collar member 42 to engage the sloping shoulder portions 43 of a disposable refrigerant container 44. Also illustrated in the drawings is a flow control valve assembly 46 which is of standard commercially available configuration. The sleeve portion 41 has diametrically opposed radially outwardly directed tabs or ear portions 47 and 48 which engage wire lock elements 49 and 50, respectively. The lock elements 49 and 50 are fastened to manually-operated hinge levers 51 and 52, respectively. The disposable container 44 is inserted into the sleeve portion 41 and a second sleeve portion 53 is positioned over the sleeve portion 41. A pair of O-rings 54 and 55 provide a fluid tight seal between the sleeve portions 41 and 53. The wire latch members 49 and 50 are then locked in place on the ear portions to draw the two sleeve portions together sufficiently to effect puncturing of the bottom wall 56 by means of a pair of piercing elements 57 and 58. A transparent window element 59 is positioned across an opening 60 formed in the bottom of the second sleeve element 53. The transparent window, or sight glass, may have the same configuration as that shown in FIG. 3. The piercing elements 57 and 58 are formed on an annular ring 61 positioned at the bottom of the second sleeve portion 53 and are captured within the fluid receiving chamber 62. The locking levers 51 and 52 are provided with arcuate portions 51a and 52a, respectively, to facilitate grasping the levers with the forefinger and thumb opening and closing of the locking mechanism. The embodiment illustrated in FIGS. 4 and 5 may also include a check valve and flow control valve similar to the structure of FIGS. 1 and 2.

Figure 6:
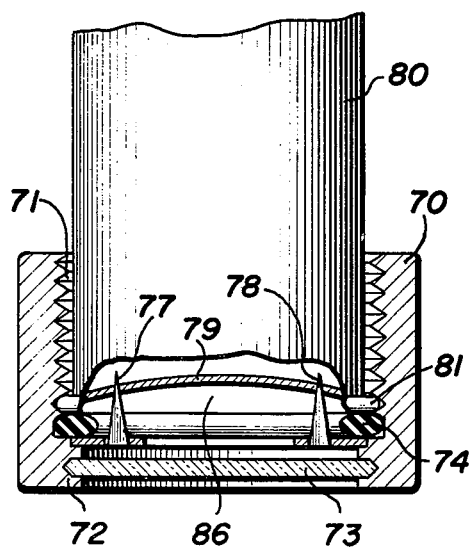
FIG. 6 illustrates still another alternate embodiment of the sight glass assembly of this invention.

Referring now to FIG. 6, there is seen still another alternate embodiment of the present invention. Here a cylindrical sleeve element 70 has a plurality of relatively large threads 71 formed within the interior thereof and has a radially inwardly turned end portion 72 to receive a transparent window element 73. In this instance a relatively large diameter in the cross section O-ring 74 is positioned at the bottom of the cylindrical sleeve and preferably has a vertical extent seen on the drawing sufficiently large to prevent the piercing elements 77 and 78 from puncturing the bottom wall 79 of a container 80 until the lower annular bead 81 is sufficiently sealed against the O-ring 74. Thereafter, further tightening of the cylindrical sleeve upon the container will cause puncturing so that the liquid within the container will communicate with the interior of a chamber 86 defined by the bottom wall 77 and the transparent window 73. The transparent window 73 may also have a graduated scale for indicating the relative amount of fluid within the container as illustrated in FIG. 3.

What has been described are several embodiments of a unique invention which enables the user of disposable containers of liquid to attach thereto a reusable sight glass assembly which allows the user to at all times monitor the amount of fluid remaining in the container. Accordingly, variations and modifications of this invention may be effected without departing from the spirit and scope of the novel concepts disclosed and claimed herein.

The invention is claimed as follows:

1. In combination a sight glass and a liquid container, said sight glass comprising: a cylindrical sleeve to be positioned about said liquid container at a sealed end thereof, said cylindrical sleeve having an opening that extends beyond said end of the container first securing means position about said container, second securing means on said cylindrical sleeve for engagement with said first securing means, a transparent window element secured across said opening of said cylindrical sleeve to be positioned adjacent the bottom of the container to form a chamber therewith, piercing means mounted on said cylindrical sleeve and positioned radially inwardly thereof to engage the bottom of the container and puncture same when said cylindrical sleeve is tightened by said first and second securing means, and annular seal means formed within said cylindrical sleeve to provide a fluid tight seal for said chamber when the bottom of the container is punctured by said piercing means, whereby the liquid within the container will enter said chamber for viewing to determine the quantity of liquid within the container.

2. The sight glass for containers as set forth in claim 1, wherein said transparent window element has graduated scale means formed thereon to indicate the quantity of liquid within the container when laid on its side with the longitudinal axis thereof held substantially horizontal.

3. The sight glass for containers as set forth in claim 2, wherein said scale means is arranged to indicate the relative amount of liquid within containers of different volumes.

4. The sight glass for containers as set forth in claim 1, wherein said second securing means is a threaded portion a said cylindrical sleeve, said first securing means is a threaded collet engaging said threaded portion, and an O-ring seal means cooperable with said threaded portion and said threaded collet to form a fluid tight seal about the periphery of the container.

5. The sight glass for containers as set forth in claim 4, wherein said O-ring seal means is formed by a first O-ring positioned between said cylindrical sleeve and said threaded collet and a second O-ring seal positioned between said collet and the periphery of the liquid container receiving the sight glass structure.

6. The sight glass for containers as set forth in claim 1, wherein said cylindrical sleeve is provided with internal threads and wherein the liquid container has a seam formed about the periphery of the bottom of the container, said seam being configurated to form at least a partial thread to engage the internal thread of said cylindrical sleeve and threadedly tighten therewith.

7. The sight glass for containers as set forth in claim 6, further including O-ring seal means formed about the periphery of said internal thread and engageable with the liquid container when inserted in said cylindrical sleeve to form a seal between the cylindrical sleeve and said container prior to puncturing the bottom of the container with said piercing means.

8. The sight glass for containers as set forth in claim 1, wherein said cylindrical sleeve includes a first sleeve portion having a radially inwardly turned portion to engage the upper shoulder of the metal liquid container, tabs extending outwardly from said first sleeve portion on opposite sides thereof, a second sleeve portion concentric with said first sleeve portion and slidable relative thereto, and snap-lock means extending from said second sleeve portion toward said first sleeve portion to engage said tabs to draw said first and second sleeve portions tightly together, whereby said piercing means will puncture the bottom of the metal liquid container to allow the liquid therein to enter said chamber.

9. A sight glass for containers as set forth in claim 8, further including O-ring seal means having a first O-ring positioned between said first and second sleeve portions and a second O-ring positioned between said first sleeve portion and the periphery of said metal, liquid container.

10. The sight glass for containers as set forth in claim 1, further including valve means extending from said cylindrical sleeve and include communication with said chamber to provide a fluid outlet for the liquid within the container.

* * * * *